Figure 6:
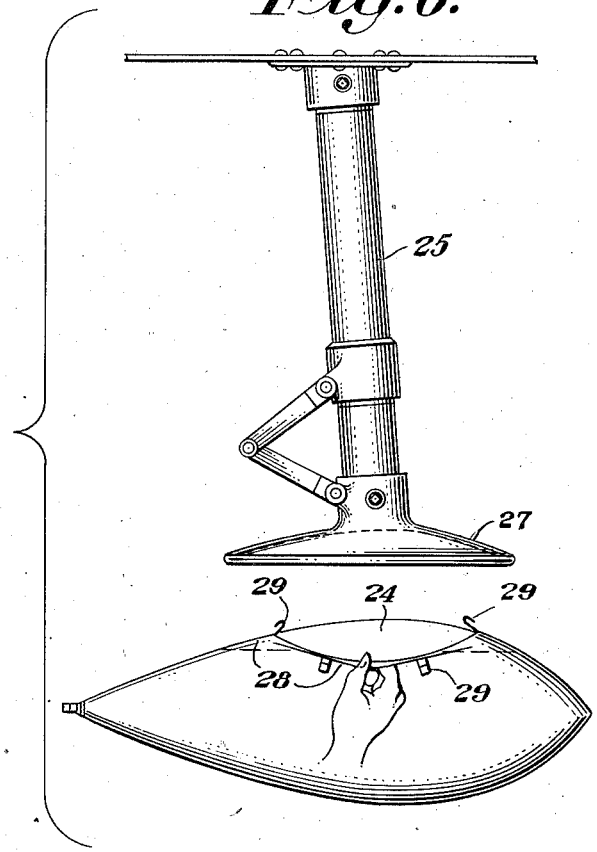

Dec. 23, 1947.  H. V. RAMÍREZ  2,433,238
LANDING DEVICE FOR AIRCRAFT
Filed Oct. 13, 1944  4 Sheets-Sheet 1
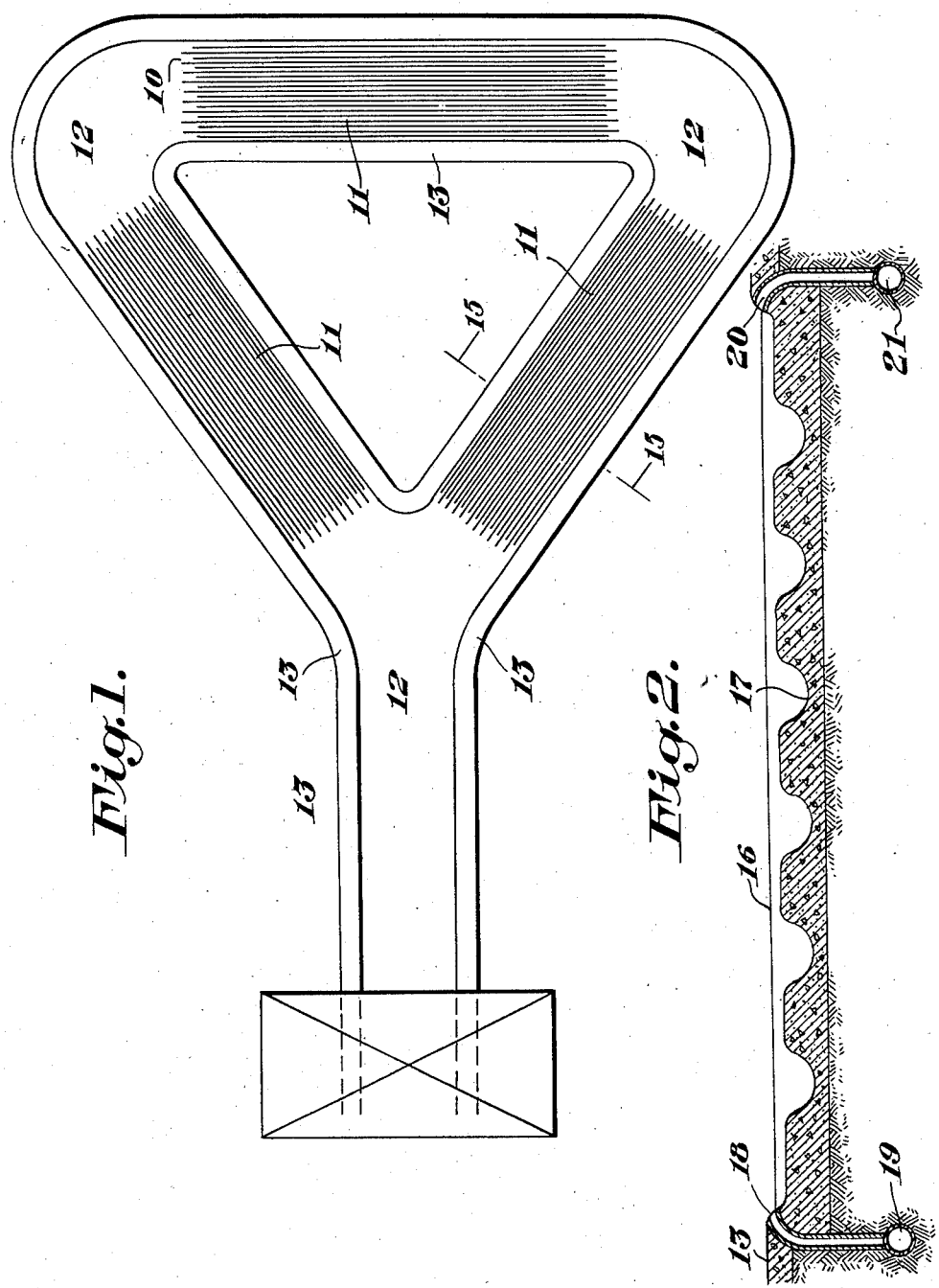
Inventor
Humberto Villarreal Ramírez

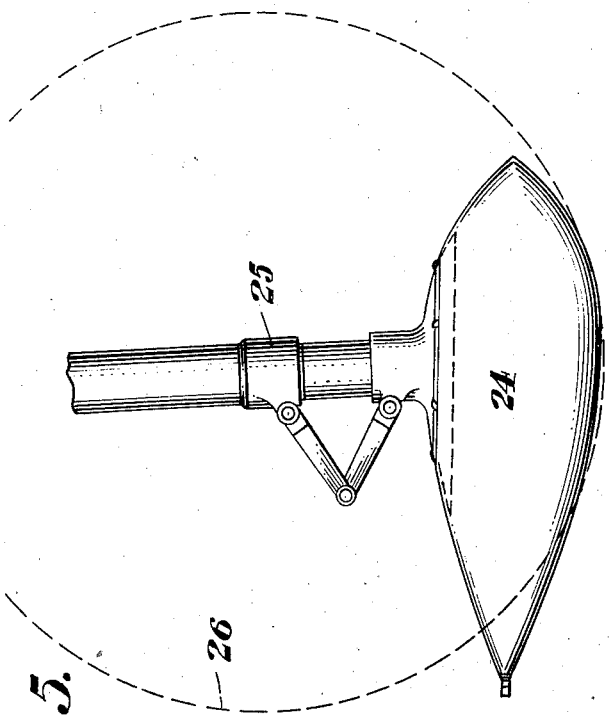
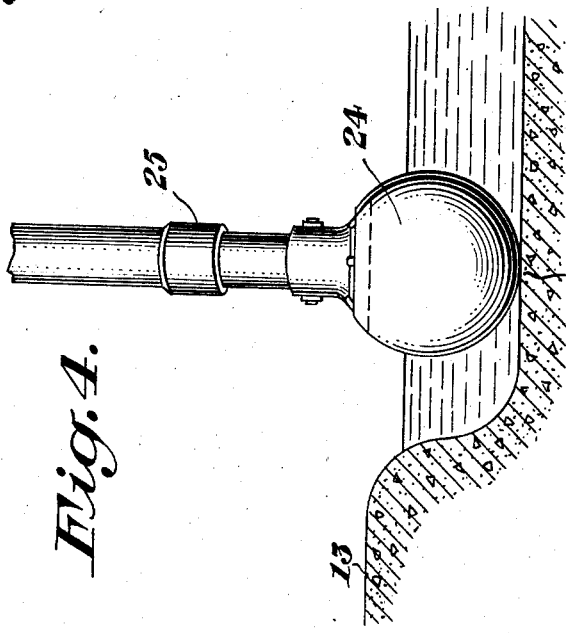
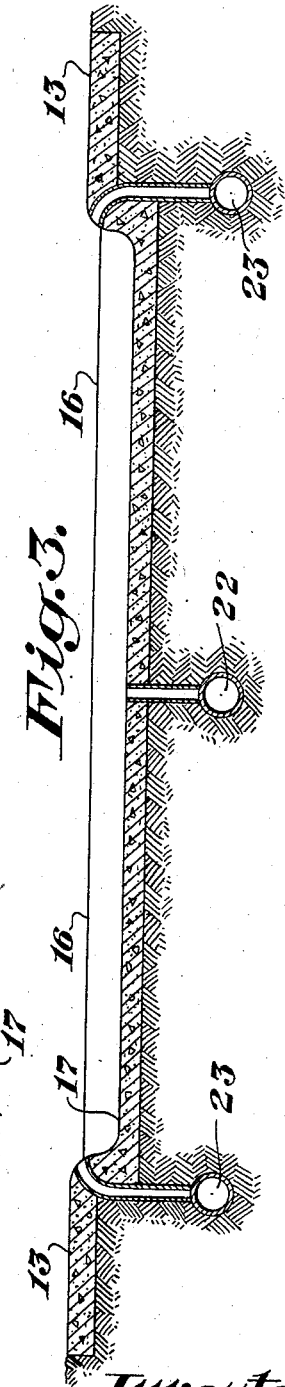

Inventor
Humberto Villarreal Ramírez

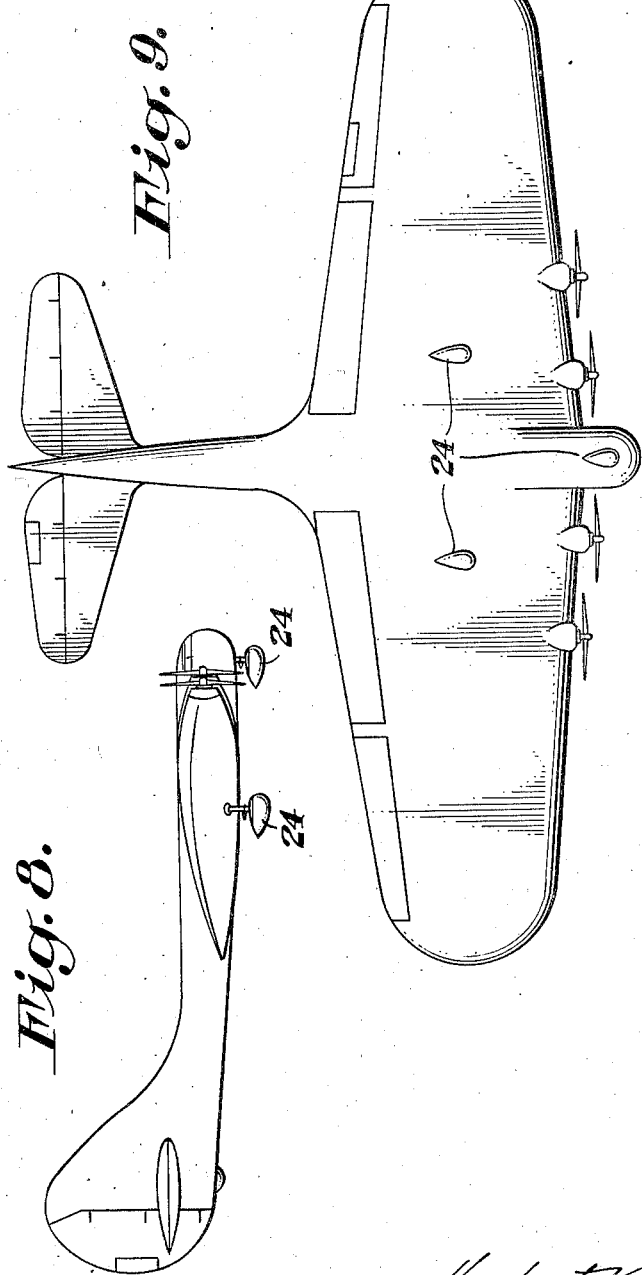
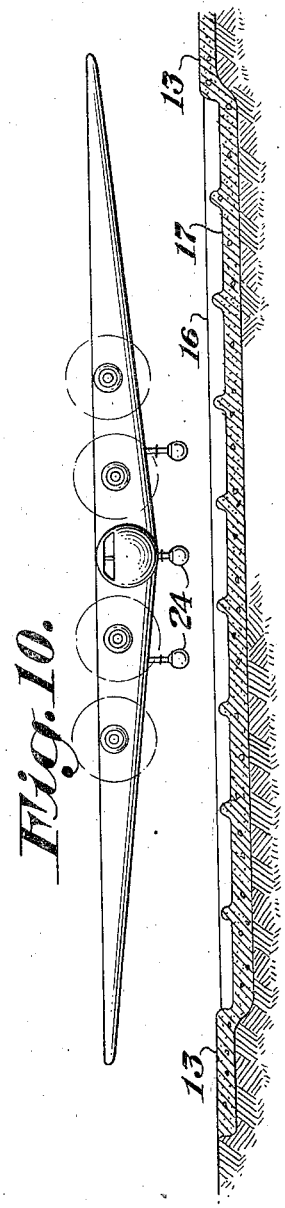

Patented Dec. 23, 1947

2,433,238

UNITED STATES PATENT OFFICE 2,433,238

LANDING DEVICE FOR AIRCRAFT

Humberto Villarreal Ramírez, Los Angeles, Calif.

Application October 13, 1944, Serial No. 558,516

4 Claims. (Cl. 244—114)

The invention relates to an artificially lubricated flying field, where flying machines can take off and land supported by sliding elements instead of wheels.

Said surface may be lubricated by means of a grease, or water, or oil, or a mixture of any convenient substances. From the standpoint of low cost muddy water with a slight amount of soap is considered the best lubricant.

The main purpose of this invention is to replace the wheels used by airplanes, autogyros, etc., by simpler, smaller and less expensive sliding elements.

The present rolling type of landing gear is difficult to adapt to giant airplanes, because of the enormous landing loads imposed on the tires and on the ground. Just to double the ground contact or supporting area of a wheel, we have to increase four times its weight and volume. Instead of large wheels following the usual arrangement, a multitude of wheels of moderate size has been suggested for giant aircraft, as an undercarriage; a complication which brings many drawbacks, mainly in connection with the maintenance, braking and retracting operations.

Using my small sliding element the retraction operation becomes unimportant; it can be given the best streamline form to minimize its drag, and also may be placed with a little positive angle of attack, in order to lift its own weight in flight. But, if desired, it is greatly easier to make such element retractable, being about five times lighter and smaller than the conventional wheel it replaces. Thousands of pounds may be added to the pay load of a big airplane, adopting my system.

The aforementioned lubricated surface may have the form of a channel with a flat bottom; or it may be a longitudinally fluted surface, to impart automatic directional stability to aircraft sliding upon it; hence, no brakes will be necessary for precise ground control. Turns on the ground may be made at slow speed, after landing or before take off, outside the fluted runway, on adjacent flat portions of the lubricated field. For these maneuvers, outboard reversible thrust propellers are advisable. Also curved flutings may be incorporated to make the sliding aircraft follow a given path on the lubricated field. Large air carriers of the near future, like large transAtlantic boats, need not have all self-control means to maneuver in harbor. Tractors are already being used to move big airplanes about the airport. Therefore, the use of brakes for precise ground control may be abandoned, chiefly in our case.

The lubricated and fluted runway may also be employed with certain advantages by aircraft with the ordinary rolling undercarriage; the right for such use is reserved herewith. Having explained the main objects and advantages of my invention, I shall now proceed to describe more fully its novel features and details of construction.

In the accompanied drawings,

Fig. 1 is a plan view of an airport with my lubricated runways 10, and fluted areas 11, provided with flat spaces 12, where the aircraft can be turned under its own power or by tractors operating upon the dry flat shoulders 13. Tractors may also be utilized to tug the sliding aircraft into and out the airport building 14.

Fig. 2 is a cross section of the runway on the line 15,15, not subject to an exact scale. It shows one of the many patterns that may be adopted for the fluted areas. This is an elementary arrangement, where cheap muddy water may be used as a lubricant. The water surface is 16, while the bottom of the runway is 17. The water comes into the channel through pipe 18, from a main conduct 19; and flows out through another pipe 20, connected with a drainage line 21.

Another proposed cross section is shown in Fig. 3, where no fluting is used. Here the feeding water line 22 is under the center of the runway; if necessary, this line may be used as a drain. Two lateral conducts 23 may be used to take the overflow, which may be directed into a boiler, not shown, in order to heat the water and then pump it back to the channel. This method to be put in operation only in very cold weather, to melt the snow and prevent freezing of the lubricating liquid. In mild cold weather the simple circulation of the water through the warm underground can prevent any snow accumulation or the formation of ice on the runway. This is a great advantage over the present methods of removing ice and snow by means of clumsy and expensive machines, which get in the way of the aircraft.

If desired, some substance may be added in winter to the lubricating liquid to lower its freezing point.

Fig. 4 is a front view of the sliding element 24, and its strut 25. The sliding element or shoe, is seen contacting the bottom 17 of the slippery runway. Here, as in the other cross sections, the surface or level of the lubricating liquid is marked 16. The mentioned strut 25, may be of the well known shock absorbing type, with a streamline cover.

Fig. 5 is a side elevation of the same sliding element and its strut; where the incomplete circle 26, drawn in broken line, gives an approximate relative size of the ordinary tire and wheel necessary to provide an equal area of ground contact as the sliding streamline shoe. Although hollow rubber, with internal air pressure, is recommended for the construction of that shoe, the inventor does not desire to limit himself to any given materials in relation with the details of his invention.

Figure 7:
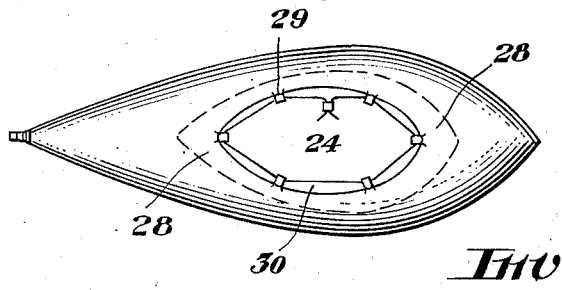

Fig. 6 depicts again the shock absorber strut, which is to be attached underneath the flying machine, fixedly or retractable; it has a spoonlike member 27, which is to rest and fit snugly over the shoe 24, that provides a flexible or elastic flange 28, to secure itself to the mentioned spoonlike member. Hooks 29 may be attached to the edge of that flange, and a stretched cable may be fastened to the hooks, as shown in the plan view of Fig. 7, in order to obtain a stronger attachment of the sliding shoe to the spoonlike part.

Figs. 8, 9 and 10 offer, respectively, lateral, underneath and front views of a giant cargo plane designed by the same inventor to show one form of fitting three sliding shoes 24 to that airplane. A different cross section pattern of my lubricated runway has been drawn under the front elevation of that cargo plane, just to emphasize the fact that there is an infinite number of different designs to select from for such cross section.

The invention is susceptible of many changes in its details and proportions of construction, and the right is herein reserved to make such changes as properly fall within the scope of the appended claims.

Having described the invention what is claimed is:

1. An elastic, streamline, sliding undercarriage for aircraft, in combination with a landing surface having the form of a shallow channel containing lubricating liquid; longitudinal flutings on the same surface; means to drain the lubricating liquid out of said channel, and to feed back the liquid to the channel; and a shoulder with a hard surface bordering such channel, substantially as set forth.

2. An elastic, streamline, sliding undercarriage for aircraft, in combination with a landing surface having the form of a shallow channel containing a lubricating liquid; longitudinal flutings on the same surface; means to drain the lubricating liquid out of said channel, and to feed back the liquid to the channel after the same liquid is heated.

3. A runway for sliding aircraft, comprising a paved area, suitable borders to keep a lubricating liquid over the same area, means to circulate said liquid out of the paved area and back into the same, a heating element for the same liquid, and longitudinal ribs over the paved area.

4. An elastic, streamline, sliding element for aircraft secured to a shock absorber instead of the usual wheel, in combination with a shallow landing channel containing lubricating substance, longitudinal flutings built on convenient portions of the landing channel, and flat portions conveniently located over the same, substantially as described.

HUMBERTO VILLARREAL RAMÍREZ.

REFERENCES CITED

The following references are of record in the file of this patent:

UNITED STATES PATENTS

| Number | Name | Date |
|---|---|---|
| 1,811,152 | Procofieff-Seversky | June 23, 1931 |
| 1,441,126 | Sherman | Jan. 2, 1923 |
| 1,648,196 | Rohmer | Nov. 8, 1927 |
| 2,066,776 | Geddes | Jan. 5, 1937 |
| 1,776,768 | Adams | Sept. 30, 1930 |
| 2,391,326 | McKinley | Dec. 18, 1945 |

FOREIGN PATENTS

| Number | Country | Date |
|---|---|---|
| 396,560 | France | Jan. 29, 1909 |
| 258,608 | Italy | Mar. 7, 1928 |
| 388,460 | Germany | Jan. 14, 1924 |
| 117,119 | Great Britain | July 3, 1918 |
| 57,022 | Germany | June 12, 1891 |

OTHER REFERENCES

Publication: "Washington Evening Star," issue of Jan. 29, 1940, picture showing the McKinley pontoon in use on an airplane landing on ice.